Figure 1:
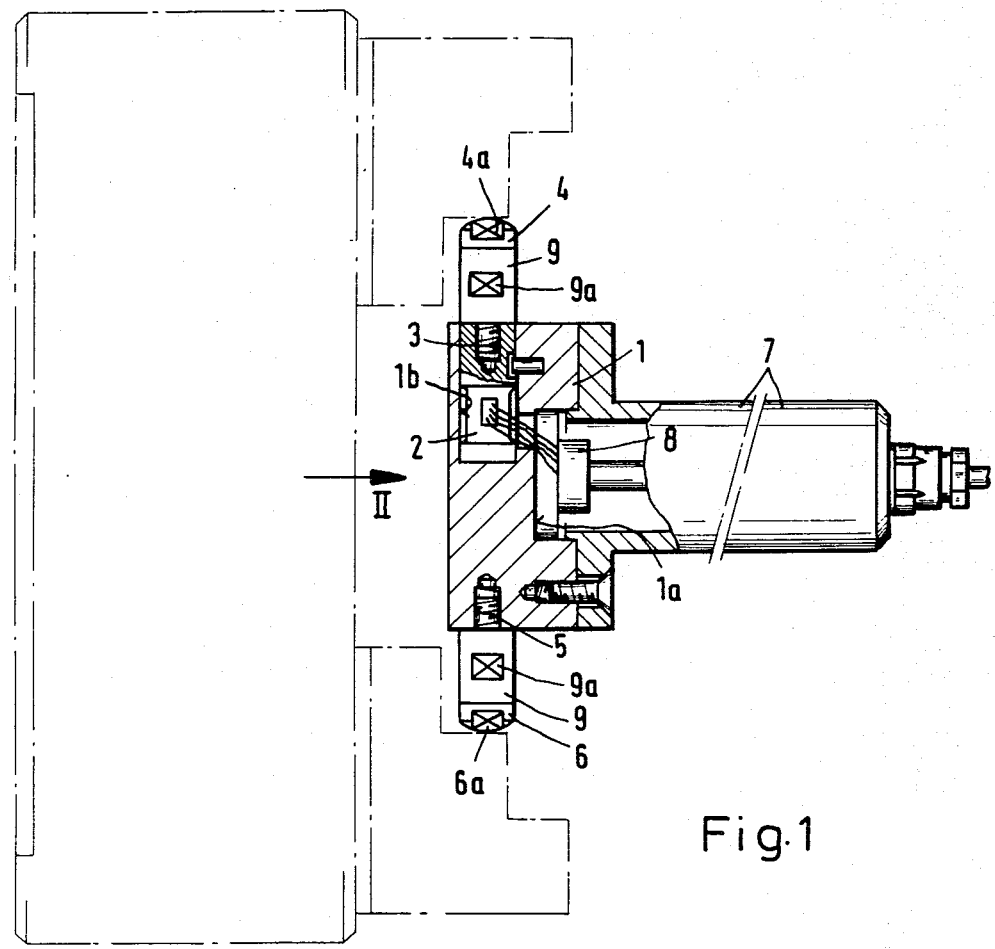

United States Patent [19]

Steinberger

[11] Patent Number: 4,489,619
[45] Date of Patent: Dec. 25, 1984

[54] DEVICE FOR MEASURING CLAMPING FORCE

[75] Inventor: Josef Steinberger, Düsseldorf, Fed. Rep. of Germany

[73] Assignee: Paul Forkardt GmbH & Co. KG, Düsseldorf, Fed. Rep. of Germany

[21] Appl. No.: 415,045

[22] Filed: Sep. 7, 1982

[30] Foreign Application Priority Data

Sep. 12, 1981 [DE] Fed. Rep. of Germany ....... 3136286

[51] Int. Cl.³ .............................................. G01L 1/22
[52] U.S. Cl. .............................. 73/862.65; 73/862.54
[58] Field of Search ........... 73/862.54, 862.04, 862.65; 33/178 R

[56] References Cited

U.S. PATENT DOCUMENTS 1,625,766  4/1927  Simpson ........................ 33/178 R
4,232,547  11/1980  Kasper ........................ 73/862.54 X Primary Examiner—James L. Rowland
Assistant Examiner—Brian R. Tumm
Attorney, Agent, or Firm—Martin A. Farber

[57] ABSTRACT

A device measures the force occurring on radially inwardly movably guided clamping elements of clamping devices. In order to create, with a simple construction, the ability to place the device directly at the corresponding clamping points of the clamping elements without the clamping elements having to be shifted or turned, there is arranged in fixed position in a housing at least one force pickup of substantially radial alignment which rests at its inner end against the housing and is provided on its outer end with a connection for a replaceable pressure piece. At least one similar pressure piece furthermore can be applied to another place on the housing.

5 Claims, 2 Drawing Figures

DEVICE FOR MEASURING CLAMPING FORCE

The present invention relates to a device for measuring the force occurring on radially inwardly movably guided clamping elements of clamping devices by means of a force pickup which is arranged in a housing.

Clamping-force measuring devices are known in various constructions. In the ordinary units, the clamping force is determined by hydraulic clamping-force measuring devices which operate in the manner of a pressure intensifier. In these known constructions, radially arranged piston units are acted on by the force exerted by the clamping elements, the force being transmitted to a pressure medium which in most cases is viscous oil. The clamping force is indicated by means of a pressure gauge, which is preferably calibrated in tons.

The disadvantage of these known hydraulic clamping-force measuring devices is that the pistons which are acted on by the clamping force must have a relatively large diameter in order to be able to keep the pressure within technically controllable limits. As a result, it is impossible to apply the clamping-force measuring device to the actual clamping surfaces of the clamping elements, particularly when the latter are provided with steps. This is a considerable disadvantage since, for instance, in the case of chucks, the clamping jaws must be removed from the chuck and turned around in order to be able to apply the hydraulic clamping-force measurer.

Another disadvantage is that, due to the size of the pistons, which have a diameter of about 30 mm, the receiving body must also be made correspondingly stable, resulting in a large distance between the clamping-force measuring device and the end surface of the clamping device. The known hydraulic clamping-force measuring devices can therefore in no case be employed at those points which are subsequently used for the clamping of the workpiece.

Aside from the hydraulic clamping-force measuring device, constructions are known which operate in accordance with the principle of conversion of mechanical values into electrical values. These force pickups are also of such a construction that the clamping elements of the clamping devices to be measured must be brought into a special measurement position, for instance by displacement or even turning in the body of the clamping devices, since the dimensions of the clamping-force measuring devices are so large thay they cannot be placed on the actual clamping points of the clamping elements.

In order to avoid the disadvantages of the known constructions, it is the object of the present invention to provide a device for measuring the force occurring on radially inwardly movably guided clamping elements by means of a force pickup which is arranged in a housing and which is of simple construction and can be placed directly on the corresponding clamping point of the clamping elements against which the workpiece later abuts, without the clamping elements having to be displaced or turned within the clamping device.

This objective is achieved by the invention in the manner that at least one force pickup of substantially radial alignment is arranged, fixed in position, in the housing of the clamping-force measuring device, abutting on its inner end against the housing and being provided at its outer end with a connection for a replaceable pressure piece which furthermore can be applied in the same way to at least one other point of the housing.

By the proposal of the invention there is provided a clamping-force measuring device which, while being of structurally simple construction, is not only small and easy to handle, but can be applied to the specific clamping point of the clamping elements of the clamping device to be checked, even with small clamping elements or if the clamping jaws have stepped clamping surfaces forming part of a jaw chuck. Particularly in the case of widely-projecting clamping elements which subject the gearing for the transmission of the clamping force to increased friction, an accurate measurement of the clamping force which can be applied is in this way possible.

In accordance with another feature of the invention, intermediate pieces (9) which in their turn have connections for the pressure pieces, 4 and 6, respectively can be connected to the respective connections 3 and 5, respectively of the force pickpu (2) and of the housing (1). In this way it is possible, by the use of different or several intermediate pieces, to bring the specific diameter of the clamping-force measuring device into correspondence with the diameter of the workpiece which is to be clamped, so that the same limit conditions are present upon the measurement of the clamping force as upon the subsequent chucking of the workpieces.

In order to make simple replacement of the pressure pieces and intermediate pieces possible, they are provided with wrench gripping (key) surfaces in accordance with the invention.

It is finally proposed by the invention that the force pickup be connected with adjusting resistors which are arranged centrally in the housing. In this way the structural expense of the device of the invention is simplified and a favorable possibility created for calibrating the force pickup by means of the adjusting resistors.

Figure 2:
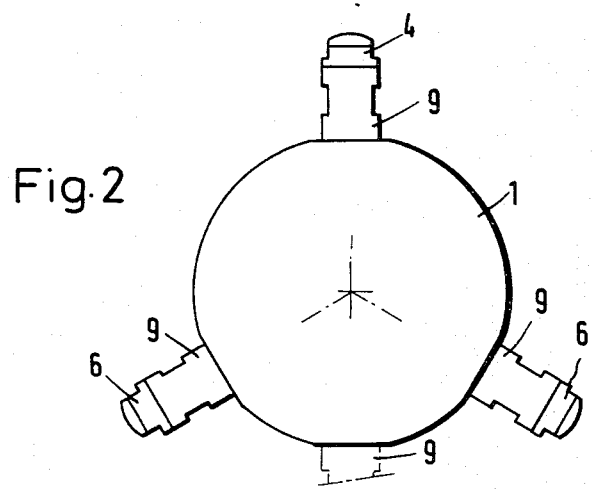

One embodiment of the device in accordance with the invention is shown in the drawing, in which:

FIG. 1 is a diagrammatic longitudinal section through a preferred embodiment of the device used for measuring the clamping force of a jaw chuck; and FIG. 2 is an end view of the device, seen in the direction of the arrow II in FIG. 1.

With the device shown in the drawing, the clamping force of clamping devices, for instance a three-jaw chuck, such as indicated in dash-dot lines in FIG. 1 of the drawing, is measured.

With the high cutting capacities of modern machine tools, high clamping forces are necessary in order to hold workpieces fast. These clamping forces are obtained only by good sliding properties on the force-transmission surfaces of the clamping devices, since the specific condition of lubrication in the gearing which transmits the force produced by a force generator to the clamping elements of the clamping device has a great influence on the magnitude of the clamping force. By the presence of grease, which substantially reduces the friction in the gearing, a high clamping force is obtained. Due to the high load per unit surface as well as external influences such as, for instance, contact with coolant, the grease does not always remain adherent to the slide surfaces. The efficiency of the chuck, i.e. the step-up ratio between the axial force produced by the force generator and the resultant radial clamping force for holding the workpiece fast, therefore decreases with the number of chuckings.

Since this decrease in clamping force occurs although the prescribed pressure is present in the force generator monitoring of the force generator is not sufficient in order to evaluate the actual holding force produced by the clamping device. Clamping-force measuring devices are used for this purpose.

The clamping-force measuring device shown in the drawing has a disk-shaped housing 1 which is provided with an axial bore 1a and a radial bore 1b. A force pickup 2 is supported on its radially inner end in the housing is arranged in the radial bore 1b.

On the radially outward end of the force pickup 2 there is provided a connection 3 for a pressure piece 4 (that is, although not shown the pressure piece 4 is able if desired to be connected directly into the connection 3), the connection 3 being formed as a threaded hole in the force pickup. At least one corresponding connection 5 (i.e. a threaded hole) is also present on the housing 1, which in this way can be provided with one or more similar pressure pieces (similar to that as described above). The number and position of the connections 5 depends on how many pressure pieces 4 and 6 respectively are present. In the embodiment shown, three pressure pieces 4 and 6 are shown in solid line in FIG. 2 since the jaw chuck to be measured is a three-jaw chuck. FIG. 2 also indicateds by dash-dot lines that the housing 1 can be provided with only one connection (5) for one pressure piece. Such an embodiement serves for measuring the clamping force on a two-jaw chuck or a corresponding clamping device, such as a screw vice.

Onto the rear end surface of the housing 1 there is screwed a grip-like extension 7 which facilitates the handling of the device and closes the axial bore 1a. Within this axial bore 1a there are contained adjusting resistors 8 by which the force pickup 2, which operates by conversion of mechanical values into electric values, can be calibrated.

By means of the pressure pieces 4 and 6 the measuring device is placed precisely at those points of the clamping elements of the clamping devices which are to be used later on to hold the workpiece. The embodiment shown by way of example cooperates with the central step of the stepped clamping jaws, as can be noted from FIG. 1. In order to be able to adapt the diameter of the measuring device approximately to the specific diameter of the workpieces to be clamped, intermediate pieces 9 are used which fit into the connections 3 and 5 of the force pickup 2 and the housing 1 respectively and in their turn have corresponding connections for the pressure pieces 4 and 6. In order to facilitate the replacement both of the pressure pieces 4 and 6 and of the intermediate pieces 9, they are provided with wrench gripping (key) surfaces 4a, 6a and 9a respectively.

By the development described above it is possible not only to adapt the device for the measuring of clamping force to the specific diameter of the workpieces to be clamped but also to arrange it at those points of the clamping element which are to be used later on to hold the workpieces. This has the result that, on the one hand, resetting and displacement of the clamping elements of the clamping device is dispensed with and, on the other hand, realistic measurement values are obtained since the condition of measurement of the clamping device corresponds to the subsequent operating condition.

I claim:

1. A device for measuring the force occurring on radially inwardly movably guided clamping elements of clamping devices by means of a force pickup which is arranged in a housing, comprising
    at least one force pickup having an inner end and an outer end and being arranged within the housing fixed in position in substantially radial alignment,
    a replaceable pressure piece,
    said force pickup resting at said inner end against the housing and having on said outer end a connection means for operatively connecting said replaceable pressure piece thereto,
    at least one other pressure piece is operatively connectable to said housing at least at one other position of the housing other than the position of the force pickup,
    adjusting resistors are arranged centrally in the housing and electrically connected with said force pickup,
    said housing is formed with an axial bore, and
    an extension is attached to said housing so as to close off said axial bore, said resistors being arranged within said axial bore.

2. A device for measuring the force occuring on radially inwardly movably guided clamping elements of clamping devices by means of a force pickup which is arranged in a housing, comprising
    exclusively one force pickup having an inner end and an outer end and being arranged fixed in position in the housing in substantially radial alignment,
    a replaceable pressure piece cooperating with one of the clamping elements of the clamping devices,
    said force pickup resting at said inner end against the housing, said force pickup having on said outer end a first connection means for operatively connecting said replaceable pressure piece thereto,
    said housing is formed with second connection means at other positions of the housing, other than the position of the force pickup, corresponding with the respective others of the clamping elements of the clamping devices,
    at least one other pressure piece depending on the clamping device to be measured is operatively connectable to said housing by said second connection means at least at one other position of the housing other than the position of the force pickup, such that said other pressure pieces are adapted to cooperate with the respective others of the clamping elements of the clamping device to be measured,
    intermediate pieces respectively connectable to said first and second connection means of the force pickup and of the housing, respectively,
    said intermediate pieces have third connection means for connecting said pressure pieces thereto, respectively.

3. The device according to claim 2, wherein
said first and second connection means are formed as threaded holes in said force pickup and said housing respectively.

4. A device for measuring the force occurring on radially inwardly movably guided clamping elements of clamping devices by means of a force pickup which is arranged in a housing, comprising
    exclusively one force pickup having an inner end and an outer end and being arranged fixed in position in the housing in substantially radial alignment,
    a replaceable pressure piece cooperating with one of the clamping elements of the clamping devices, said force pickup resting at said inner end against the housing, said force pickup having on said outer end a first connection means for operatively connecting said replaceable pressure piece thereto, said housing is formed with second connection means at other positions of the housing, other than the position of the force pickup, corresponding with the respective others of the clamping elements of the clamping devices, at least one other pressure piece depending on the clamping device to be measured is operatively connectable to said housing by said second connection means at least at one other position of the housing other than the position of the force pickup, such that said other pressure pieces are adapted to cooperate with the respective others of the clamping elements of the clamping device to be measured, intermediate pieces respectively connectable to said first and second connection means of the force pickup and of the housing, respectively, said intermediate pieces have third connection means for connecting said pressure pieces thereto, respectively, said pressure pieces and said intermediate pieces have key gripping surfaces.

5. The device according to claim 4, wherein said pressure pieces and said intermediate pieces are cylindrical.

* * * * *